United States Patent [19]

Eto et al.

[11] 3,719,771

[45] March 6, 1973

[54] STRIPED FILTERS FOR COLOR VIDEO SIGNAL GENERATORS

[75] Inventors: Yoshizumi Eto, Hachioji; Masao Hibi, Kodaira, both of Japan

[73] Assignee: Hitachi, Ltd., Tokyo, Japan

[22] Filed: March 8, 1971

[21] Appl. No.: 121,955

[30] Foreign Application Priority Data

March 9, 1970 Japan ....................45/19286

[52] U.S. Cl. ....................178/5.4 ST

[51] Int. Cl. ....................H04n 9/06

[58] Field of Search......178/5.4 ST; 350/162 SF, 169

[56] References Cited

UNITED STATES PATENTS

| | | | |
|---|---|---|---|
| 3,647,943 | 3/1972 | Marshall | 178/5.4 ST |
| 3,609,010 | 9/1971 | Mueller | 350/162 |
| 3,470,310 | 9/1969 | Shashoua | 178/5.4 |
| 3,378,633 | 4/1968 | Macovski | 178/5.4 |

*Primary Examiner*—Robert L. Richardson
*Attorney*—Craig, Antonelli, Stewart & Hill

[57] ABSTRACT

A striped filter structure for color video signal generators comprising a first striped filter consisting of an alternate arrangement of transparent stripes and yellow stripes and a second striped filter consisting of an alternate arrangement of transparent stripes and cyanic stripes, the stripes of the first striped filter being at an angle to the stripes of the second striped filter.

2 Claims, 11 Drawing Figures

INVENTORS

YOSHIZUMI ETO AND
MASAO HIBI

BY Craig, Antonelli, Stewart & Hill
ATTORNEYS

INVENTORS

YOSHIZUMI ETO AND
MASAO HIBI

BY Craig, Antonelli, Stewart & Hill
ATTORNEYS

INVENTORS
YOSHIZUMI ETO AND
MASAO HIBI
BY Craig, Antonelli, Stewart & Hill
ATTORNEYS

STRIPED FILTERS FOR COLOR VIDEO SIGNAL GENERATORS

BACKGROUND OF THE INVENTION

1. Field of the Invention

This invention relates to striped filters for color video signal generators and, more particularly, to stripes filters enabling to provide optimum color video signals.

2. Description of the Prior Art

The color television camera should provide an output containing information about red (R), green (G) and blue (B) components of the scene being televised. Although a typical TV camera has three separate image pick-up tubes for the respective components, systems using a single image pick-up tube such as will be described hereinafter have been proposed from the aspects of economy and size reduction. In these systems, however, the frequency band of the G component that substantially determines the horizontal resolution of the color picture differs from the frequency bands of the R and B components. Therefore, restriction is imposed on the resolution in spit of a broad frequency bandwidth, over which the image pick-up tube can respond.

SUMMARY OF THE INVENTION

Accordingly, an object of the invention is to provide a novel striped filter structure for use in color video signal generators, which can provide excellent resolution over a range substantially equal to the response range of the image pick-up tube.

Another object of the invention is to provide a striped filter structure, which enables providing optimum color video signals.

To serve the above ends, the invention features a filter structure comprising a transparent-yellow filter having transparent and yellow stripes and a transparent-cyan filter having transparent and cyanic stripes, in which the density of the yellow stripes and that of the cyanic stripes as well as the angle between these stripes are selected such that optimum color video signals may be obtained.

DESCRIPTION OF THE PREFERRED EMBODIMENTS

Figure 1:
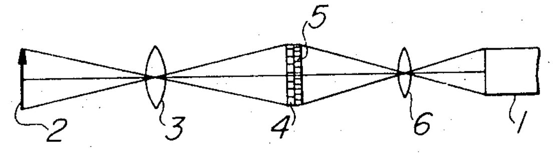
FIG. 1 PRIOR ART
FIG. 1 is a pictorial representation of the optical system of a conventional color video signal generator.

FIG. 1 shows the optical system of the conventional color video signal generator using a single image pick-up tube for producing a kind of composite color signal from red (R), green (G) and blue (B) video signals. Reference numeral 1 designates an image pick-up tube, numeral 2 a foreground subject being televised, numeral 3 an objective lens, numerals 4 and 5 respective striped filters, and numeral 6 a relay lens.

Figure 2:
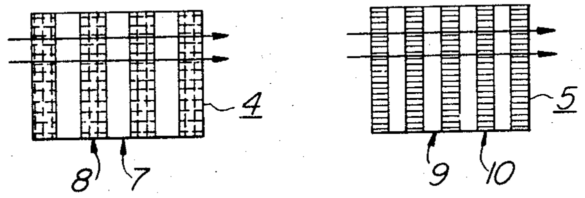
FIG. 2 PRIOR ART
FIG. 2 shows conventional striped filters.

The striped filters 4 and 5 are disposed in the optical path such that they focus the real image of the televised scene on the light-sensitive face of the image pick-up tube 1 or an optically equivalent plane. They respectively have a structure as shown in FIG. 2. The striped filter 4 consists of an alternate arrangement of stripes 7, which are transparent (R+ G + B) stripes, and stripes 8, which are yellow (R + G) stripes. The striped filter 5 consists of an alternate arrangement of stripes 9, which are transparent (R + G + B) stripes, and stripes 10, which are cyanic (G + B) stripes. These two filters are arranged such that the stripes are substantially perpendicular to the direction of the horizontal electron beam scanning. When the image of the scene is focused through these filters 4 and 5 on the light-sensitive face of the tube 1, the yellow filter 4 and cyanic filter 5 respectively block the blue (B) component and red (R) component of the incident light to them stripe-wise. If the width ratio of the transparent to yellow stripes in the filter 4 and the transparent to cyan stripes in the filter 5 is 1:1, the electron beam scanning of the image on the image face of the image pick-up tube 1 provides an output signal S(t) expressed as $$S(t) = G + (R/2)a_R\ \{1 + m_R \cos(\omega_R t + \phi_R)\} + (B/2)a_R\ \{1 + m_B \cos(\omega_B t + \phi_B)\} \qquad (1)$$

where $a_R$ and $a_B$ designate constants depending upon the spectral sensitivity of the image pick-up tube to red and blue signals respectively;

$m_R$ and $m_B$ designate constants depending upon the modulation degree of the image pick-up tube and the pass band of the succeeding amplifiers for red and blue signals respectively;

$\omega_R$ and $\omega_B$ are equal to $2\pi/T_R$ and $2\pi/T_B$ respectively;

$T_R$ and $T_B$ designate times required to scan one pitch of the striped filter 4 and that of the striped filter 5 respectively; and $\phi_R$ and $\phi_B$ designate constants depending upon the disposition of the two striped filters respectively.

Figure 3:
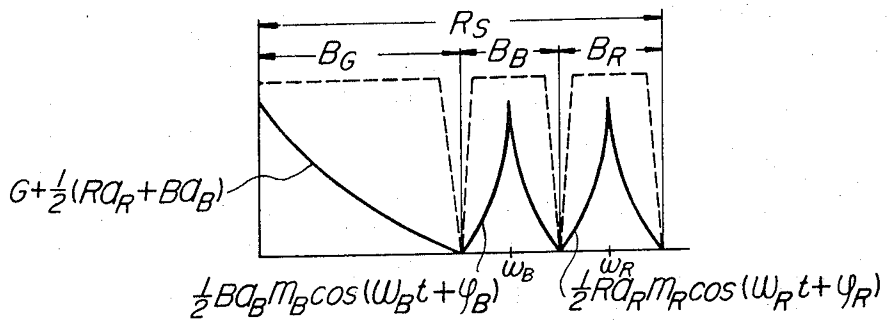
FIG. 3 PRIOR ART
FIG. 3 is a spectral chart for the output signal of the image pick-up tube obtained with a conventional optical system.

A spectral chart of the components of the signal of equation (1) is indicated by a solid curve in FIG. 3.

Figure 4:
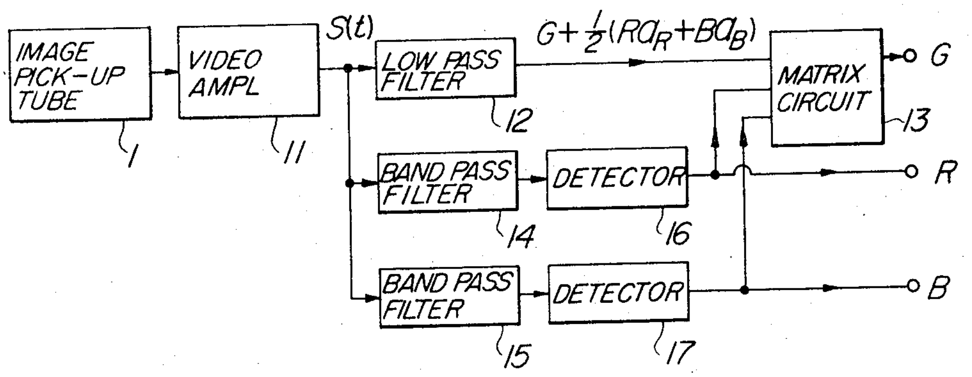
FIG. 4 PRIOR ART
FIG. 4 is a block diagram showing a conventional color video signal generator.

FIG. 4 shows a conventional color video signal generator to produce red (R), green (G) and blue (B) signals respectively responsive to the three primary color image from the composite color signal obtained in the above manner. In the Figure, numeral 1 designates the image pick-up tube providing the composite color signal S($t$), which is amplified by a video amplifier 12. The amplified composite color signal is fed to a low pass filter 12, which is sensitive to a band as indicated at $B_G$ in FIG. 3 and selectively passes a component given as G + 1/2($Ra_R$ + $Ba_B$) from the signal S($t$). The output of the low pass filter 12 is fed to a matrix circuit 13. The amplified composite color signal S($t$) is also fed to band pass filters 14 and 15 respectively sensitive to bands $B_R$ and $B_B$ with center frequencies $\omega_R$ and $\omega_B$. The band pass filters 14 and 15 respectively separate the red (R) and blue (B) components respectively fed to detectors 16 and 17, which provide the respective R and B signals. These signals are also fed to the matrix circuit 13, which in turn provides the green (G) signal as its output.

Referring now to FIG. 3, where the upper limit of $B_G$ substantially coincides with $\omega_B - 1/2B_B$ and $\omega_B + 1/2B_B$ with $\omega_R - 1/2B_R$ (such selection of the pass bands of the filters being advantageous in that response range $R_S$ of the image pick-up tube can be effectively utilized), unless the bandwidths of the components $G + 1/2(Ra_R + Ba_B)$, $1/2Ra_Rm_R\cos(\omega_Rt + \phi_R)$ and $1/2Ba_Bm_B\cos(\omega_Bt + \phi_B)$ are respectively less than $B_G$, $B_R$ and $B_B$, some spectral portions of the components overlap, resulting in crosstalk. It is, therefore, desirable to restrict the bands of the G, R and B components respectively to $B_G$, $1/2B_R$ and $1/2B_B$ in the stage of disassembling the light scene into component colors.

As is apparent from the spectral chart of FIG. 3, in the conventional color video signal generator as described above the maximum bandwidth for the B component that substantially determines the horizontal resolution of the reproduced image is $B_G$, whereas the image pick-up tube should be able to respond up to a frequency of $\omega_R + 1/2B_R$. If, for example, $F_G$ = 2.8 MHz, $F_R = F_B$ = 1.0 MHz, $f_B$ = 3.3 MHz, $f_R$ = 4.3 MHz (where $F_i = B_i/2\pi$, $f_i = \pi_i/2\pi$, and $i$ is R, G or B), the image pick-up tube is required to be able to respond up to $f_R + 1/2F_R$ = 4.8 MHz. Therefore, if the image pick-up tube is small in size, high resolution cannot be obtained for the reproduced color pictures.

Figure 5A:
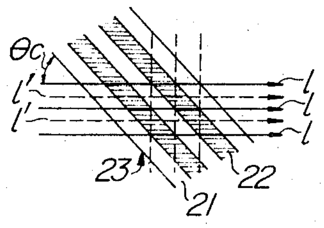
FIGS. 5*a* and 5*b* show a striped filter arrangement according to the invention.
Figure 5B:
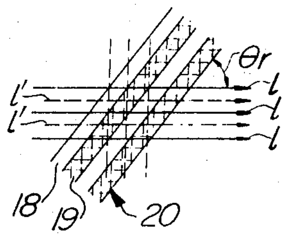

FIGS. 5a and 5b show filter structures according to the invention, which obviate the above drawbacks. Referring to the Figures, a filter 20 comprises an alternate arrangement of transparent (R + G + B) stripes 18 (white part) and yellow (R + G) stripes 19 (shaded part). Another striped filter 23 comprises an alternate arrangement of transparent (R + G + B) stripes 21 (white part) and cyanic (G + B) stripes 22 (shaded part). These filters 20 and 23 are disposed slant-wise such that their stripes make respective angles $\theta_r$ and $\theta_c$ with the horizontal scanning lines so that with respect to a vertical linear portion of the scanned image face the same kind of stripes of each filter extended over every other horizontal scanning lines $l$ or $l'$ of the same field ($l$ being horizontal lines of the first field and $l'$ of the second field).

The number or pitch of the stripes and the angle thereof with respect to the horizontal scanning lines can be theoretically determined.

Figure 6:
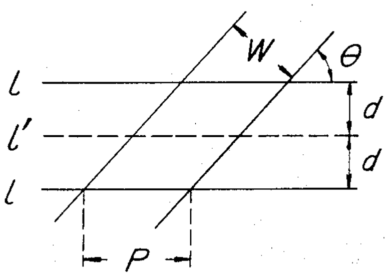
FIG. 6 is a view given for the purpose of illustrating the theoretical principles underlying the invention.

Referring now to FIG. 6, denoting the distance between adjacent horizontal scanning lines by $d$, the width of the stripes (the width ratio of the transparent to yellow or cyanic stripes being 1:1) by $W$, the angle between each stripe and each horizontal scanning line by $\theta$, and the distance covered by the scanning beam as it scans one stripe by $P$, $$\sin\theta = 2d/\sqrt{p^2+(2d)^2} \qquad (2)$$

and $$W = P\sin\theta = 2pd/\sqrt{p^2+(2d)^2} \qquad (3)$$

Also, by denoting the vertical dimension of the image by $V$, the horizontal dimension of the image by $H$, the number of horizontal scanning lines in one frame by $M$, the effective vertical scanning ratio by $\alpha$ which is the ratio of the vertical scanning time to the sum of scanning time and retrace time, and the number of stripe pairs (each stripe pair consisting of a transparent stripe and a yellow or cyanic stripe) scanned by the scanning beam over the distance $H$ by $N$, $$d = V/M\alpha \qquad (4)$$

and $$P = H/2N \qquad (5)$$

Meanwhile, by denoting the number of stripe pairs scanned by the scanning beam over the distance $H$ if the filters are arranged such that the stripes are perpendicular to the horizontal scanning lines by $N'$, $$N' = (p/W)N = \sqrt{1+(p/2d)^2}\cdot N \qquad (6)$$

while $$p/2d = \tfrac{1}{2}\times(H/2N)\times(M\alpha/V) = HM\alpha/4NV \qquad (7)$$

Hence, $$N' = \sqrt{1+(HM\alpha/4NV)^2}\cdot N = \sqrt{N^2+(HM\alpha/4V)^2} \qquad (8)$$

Now, denoting the horizontal scanning period by $T_H$, the frequency obtained from the stripes and horizontal scanning lines by $f_c$, and the effective horizontal scan ratio by $\beta$ which is the ratio of the horizontal scanning time to the sum of the scanning time and retrace time, $$N = T_H\beta/(1/f_c) = T_H\beta f_c \qquad (9)$$

Hence, $$N' = \sqrt{(T_H\beta f_c)^2+(HM\alpha/4V)^2} \qquad (10)$$

Also, from equations 2, 7 and 9

$$\sin\theta = \frac{1}{\sqrt{1+\left(\frac{p}{2d}\right)^2}} = \frac{1}{\sqrt{1+\left(\frac{HM\alpha}{4NV}\right)^2}} = \frac{1}{\sqrt{1+\left(\frac{HM\alpha}{4T_H\beta f_c V}\right)^2}} \qquad (11)$$

Hence, $$\theta = \sin^{-1}\frac{1}{\sqrt{1+\left(\frac{4M\alpha}{4T_H\beta f_c V}\right)^2}} \qquad (12)$$

Next, denoting the frequency obtained from the transparent-yellow filter by $f_{cr}$, and the frequency obtained from the transparent-cyanic filter by $f_{cc}$, the number $N'_r$ of stripe pairs of the transparent-yellow filter and the number $N'_c$ of stripe pairs of the transparent-cyanic filter are expressed, from equation 10, as $$N'_r = \sqrt{(T_H\beta f_{cr})^2+(HM\alpha/4V)^2} \qquad (13)$$

and $$N'_c = \sqrt{(T_H\beta f_{cc})^2+(HM\alpha/4V)^2} \qquad (14)$$

Also, the angle $\theta_r$ of the transparent-yellow filter with respect to the horizontal scanning lines and the angle $\theta_c$ of the transparent-cyanic filter with respect to the horizontal scanning lines are expressed, from equation 12, as $$\theta_r = \sin^{-1}\frac{1}{\sqrt{1+\left(\frac{HM\alpha}{4T_H\beta f_{cr} V}\right)^2}} \qquad (15)$$

and $$\theta_c = \sin^{-1}\frac{1}{\sqrt{1+\left(\frac{HM\alpha}{4T_H\beta f_{cc} V}\right)^2}} \qquad (16)$$

The angle $\theta_Y$ between the two filters is given as $$\theta_Y = \theta_r + \theta_c \qquad (17)$$

or $$\theta_Y = \theta_r - \theta_c \qquad (18)$$

For instance, if $\alpha = 0.96$, $\alpha = 0.83$, $V/H = 3/4$, $M = 525$, $T_H = 6.35\ \mu$ s, $f_{cc} = 2$ MHz and $f_{cr} = 3$ MHz, $$N'_r \approx 231,$$

$$N'_c \approx 198,$$

$$\theta_r \approx 44°,$$

$$\theta_c \approx 32°, \quad \text{and}$$

$$\theta_Y \approx 76° \text{ or } 12°.$$

Thus, with two filters having stripe pair densities given by equations 13 and 14 and orientated such that define a cross-over angle given by equation 17 or 18 and make an angle given by equation 15 or 16 with respect to the horizontal scanning lines, the same kind of stripes of each filter will extend over every other horizontal scanning lines for a vertical linear portion of the scanned image face, providing phase reversal for every horizontal scanning line of the same field.

Figure 7:
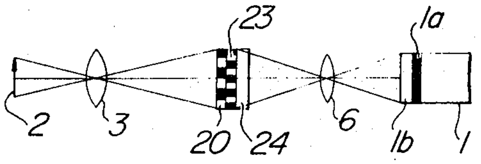
FIGS. 7 to 9 are views similar to FIG. 1 but showing respective embodiments of the optical system according to the invention.

FIG. 7 outlines an embodiment of the optical system using the filters described above. In the Figure, identical parts to those in FIG. 1 are designated by like reference numerals. Reference symbol 1$a$ designates the photo-sensitive face of the image pick-up tube 1, symbol 1$b$ face plate covering the photo-sensitive face 1$a$. The striped filters 20 and 23 are supported by a glass support 24.

Figure 8:
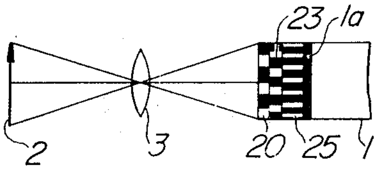
Figure 9:
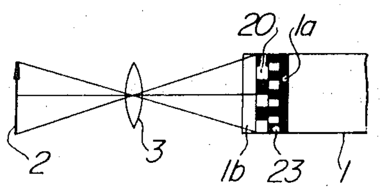

In the preceding embodiment, the filters 20 and 23 are separated from the image pick-up tube 1. In the embodiment of FIG. 8, these filters are indirectly applied on the photo-sensitive face 1$a$ of the tube 1 through an optical fiber 25. In the embodiment of FIG. 9, these filters are directly applied on the photo-sensitive face 1$a$ and covered with a glass plate 1$b$. In the latter embodiments, the relay lens is advantageously dispensed with.

Figure 10:
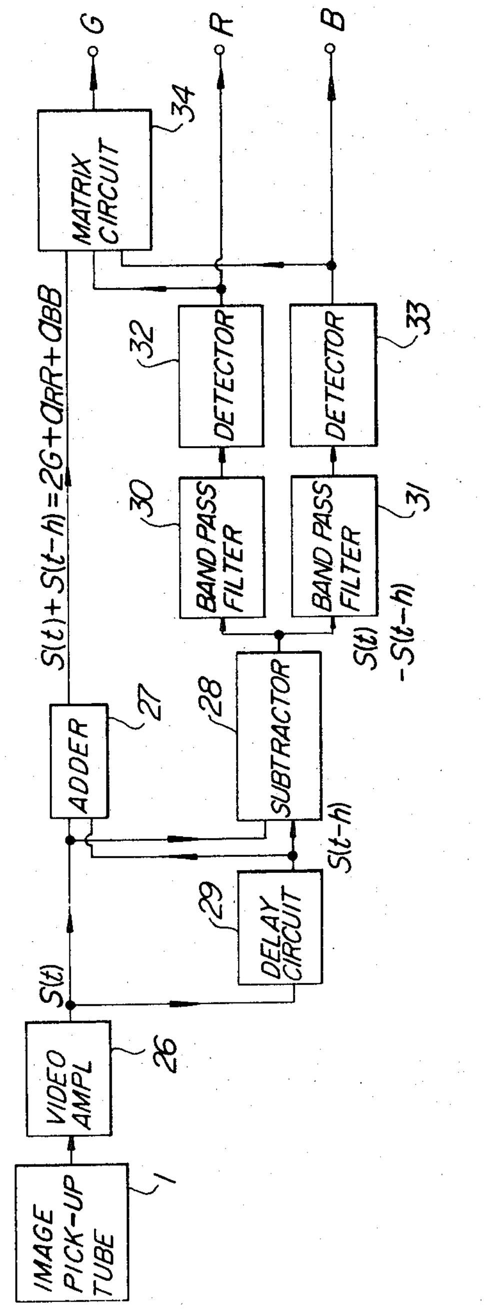
FIG. 10 is a block diagram showing a color video signal generator embodying the invention.

FIG. 10 shows a color video signal generator according to the invention. The image pick-up tube 1 converts the optical image focused thereon through the optical system of FIG. 7, 8 or 9 having the filter 20 and 23 into the composite color signal $S(t)$. This signal is amplified by a video amplifier 26, whose output signal is fed to an adder 27 and to a subtractor 28. The signal $S(t)$ is also fed to a delay circuit 29 providing a delay time equal to one horizontal scanning period $h$. The output signal $S(t - h)$ of the delay circuit 29 is also fed to the adder 27 and subtractor 28. The adder 27 provides output signal $S(t) + S(t - h)$, and the subtractor 28 provides output signal $S(t) + S(t - h)$. The output of the subtractor 28 is fed to band pass filters 30 and 31, which respectively separate the $R$ component and $B$ component coupled to respective detectors 32 and 33, which in turn provides the respective $R$ and $B$ signals. These signals are fed together with the output of the adder 27 to a matrix circuit 34, which provides the $G$ signal. In this manner, color signals having high horizontal resolution can be obtained by using a single image pick-up tube.

The output signal S($t$) of the image pick-up tube 1 is given as $$S(t) = G + 1/2a_R R(1 + m_R \sin 2\pi f_{cc}) + 1/2a_B B(1 + m_B \sin 2\pi f_{cr}),$$

where $m_R$ and $m_B$ are constants depending upon the modulation degree of the image pick-up tube 1.

On the other hand, the signal $S(t - h)$ leading the signal $S(t)$ by one horizontal scanning period $h$ is given as $$S(t-h) = G' + 1/2a_R R'(1 - m_R \sin 2\pi f_{cc}) + 1/2a_B B'(1 = m_B \sin 2\pi f_{cr}).$$

Also, from the vertical correlation $$G \approx G', R \approx R', \text{and } B \approx B'.$$

Thus, the output of the adder 27 is $$S(t) + S(t-h) = 2G + a_R R + a_B B,$$

And the output of the subtractor 28 is $$S(t) - S(t-h) = a_R R m_R \sin 2\pi f_{cc} + a_B B m_B \sin 2\pi f_{cr}.$$

From these equations it is apparent that filtering and detection of the output of the subtractor 28 yields the $R$ and $B$ signals and eliminating the $R$ and $B$ components from the output of the adder 27 by the matrix circuit 34 yields the $G$ signal. Since the $G$ component is not passed through a low pass filter, its resolution is equal to the response of the image pick-up tube.

As has been described in the foregoing, according to the invention there is no need to divide the frequency spectrum among the $R$, $G$ and $B$ components representing the information concerning the three primary colors of the color picture, but these components may cover a common spectrum, and since the $G$ component covers the entire response range of the image pick-up tube the resolution of the composite color signal can be extremely high. Also, it is possible to reduce the size of the image pick-up tube.

We claim:

1. A filter unit for color video signal generators comprising a first striped filter comprising an alternate arrangement of transparent stripes and yellow stripes and a second striped filter comprising an alternate arrangement of transparent stripes and cyanic stripes, the stripes of said first striped filter being at an angle to the stripes of said second striped filter, wherein the number of stripe pairs each of a transparent stripe and a yellow stripe of said first striped filter and the number of stripe pairs each of a transparent stripe and a cyanic stripe of said second striped filter extending over the width of an image face of the color video signal generator optically coupled to said filter unit, are respectively given as $$\sqrt{(T_H \beta f_{cr})^2 + (HM\alpha/4V)^2} \text{ and } \sqrt{(T_H \beta f_{cc})^2 + (HM\alpha/\mathrm{BK}V)^2},$$

and the angles defined by the stripes of said first and second striped filters are given as $$\sin^{-1} \frac{1}{\sqrt{1 + \left(\frac{HM\alpha}{4T_H \beta f_{cr} V}\right)^2}} \pm \sin^{-1} \frac{1}{\sqrt{1 + \left(\frac{HM\alpha}{4T_H \beta f_{cc} V}\right)^2}},$$

and wherein $T_H$ is one horizontal scanning period, $\alpha$ is the effective vertical scanning ratio, $\beta$ is the effective horizontal scanning ratio, $f_{cr}$ is the frequency obtained from the stripe pairs each of a transparent stripe and a yellow stripe, $f_{cc}$ is the frequency obtained from the stripe pairs each of a transparent stripe and a cyanic stripe, $V$ is the height of said image face, $H$ is the width of said image face, and $M$ is the number of horizontal scanning lines per frame.

2. A color video signal generator comprising: a scanning type pick-up tube having an image face and providing an output signal; an optical filter unit coupled to said pick-up tube such that an image is picked up by said pick-up tube via said filter unit; circuit means for delaying a portion of the output of said pick-up tub by one horizontal scanning period of time and providing an output thereof; adder circuit means for producing a sum signal of a portion of the output of said pick-up tube and a portion of the output of said delaying circuit; and subtractor circuit means for producing a difference signal between a portion of the output of said pick-up tube and a portion of the output of said delaying circuit; said optical filter unit comprising a first striped filter comprising an alternate arrangement of transparent stripes and yellow stripes and a second striped filter comprising an alternate arrangement of transparent stripes and cyanic stripes, the stripes of said first-striped filter being at an angle to the stripes of said second striped filter, wherein the number of stripe pairs each of a transparent stripe and a yellow stripe of said first striped filter and the number of stripe pairs each of a transparent stripe and a cyanic stripe of said second striped filter extending over the width of the image face of the pick-up tube optically coupled to said filter unit, are respectively given as $$\sqrt{(T_H\beta f_{cr})^2+(HM\alpha/4V)^2} \text{ and } \sqrt{(T_H\beta f_{cc})^2+(HM\alpha/BKV)^2},$$

and the angles defined by the stripes of said first and second striped filters are given as $$\sin^{-1}\frac{1}{\sqrt{1+\left(\frac{HM\alpha}{4T_H\beta f_{cr}V}\right)^2}} \pm \sin^{-1}\frac{1}{\sqrt{1+\left(\frac{HM\alpha}{4T_H\beta f_{cc}V}\right)^2}}$$

and wherein $T_H$ is one horizontal scanning period, $\alpha$ is the effective vertical scanning ratio, $\beta$ is the effective horizontal scanning ratio, $f_{cr}$ is the frequency obtained from the stripe pairs each of a transparent stripe and a yellow stripe, $f_{cc}$ is the frequency obtained from the stripe pairs each of a transparent stripe and a cyanic stripe, $V$ is the height of said image face, $H$ is the width of said image face, and $M$ is the number of horizontal scanning lines per frame.

* * * * *